United States Patent [19]

Vos

[11] 4,371,480

[45] Feb. 1, 1983

[54] PROPELLER FOR DISTRIBUTING A GASEOUS, POWDERED OR LIQUID MATERIAL IN A LIQUID

[75] Inventor: Geert H. Vos, Haren, Netherlands

[73] Assignee: Noordvos Schroeven B.V., Groningen, Netherlands

[21] Appl. No.: 85,215

[22] Filed: Oct. 16, 1979

[30] Foreign Application Priority Data

Apr. 12, 1978 [NL] Netherlands ........................ 7803906

[51] Int. Cl.[3] ............................................... B01F 3/04

[52] U.S. Cl. .................................. 261/87; 416/90 R; 422/259; 422/275

[58] Field of Search .............................. 261/87, 91-93, 261/84; 422/258, 259, 274, 275, 279; 210/221.2; 416/90

[56] References Cited

U.S. PATENT DOCUMENTS

| | | | |
|---|---|---|---|
| 1,583,591 | 5/1926 | Greenawalt | 261/87 |
| 2,041,184 | 5/1936 | Isenhour | 261/87 |
| 3,092,678 | 6/1963 | Braun | 261/87 X |
| 3,108,146 | 10/1963 | Gross | 261/87 |
| 3,123,651 | 3/1964 | Gross et al. | 261/87 X |
| 3,206,176 | 9/1965 | Peterson | 261/93 X |
| 3,207,313 | 9/1965 | Schulze | 261/87 |
| 3,400,051 | 9/1968 | Hofschneider | 261/87 X |
| 3,482,520 | 12/1969 | Larsen | 261/87 |
| 3,630,498 | 12/1971 | Bielinski | 261/87 |
| 3,677,528 | 7/1972 | Martin | 261/87 |
| 3,846,516 | 11/1974 | Carlson | 261/87 |
| 3,911,064 | 10/1975 | McWhirter et al. | 261/87 |
| 4,231,974 | 11/1980 | Engelbrecht et al. | 261/87 |

FOREIGN PATENT DOCUMENTS

| | | |
|---|---|---|
| 2071402 | 4/1971 | France . |
| 7601422 | 5/1976 | Netherlands . |

OTHER PUBLICATIONS

Marks, Mechanical Engineer's Handbook, p. 285, McGraw-Hill, Cpr. 1951.

*Primary Examiner*—Tim R. Miles
*Attorney, Agent, or Firm*—Irvin A. Lavine

[57] ABSTRACT

Apparatus and propeller for distributing a gaseous, liquid or powdered material in a liquid by rotation in the liquid of a propeller having two or more blades. The blades have a perforated hollow portion connected to a source for the gas. The propeller is rotated at a cavitation producing velocity, and for the distribution of the material in the liquid use is made of the pressures occurring upon the implosion of the cavitations.

3 Claims, 4 Drawing Figures

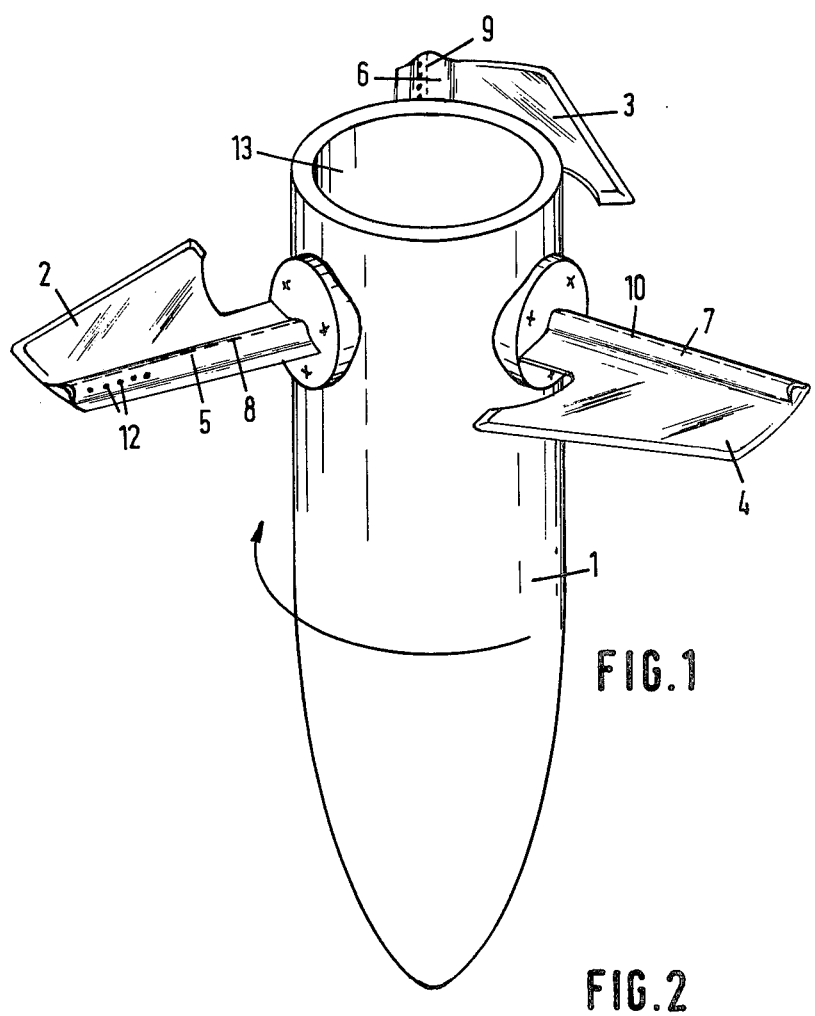
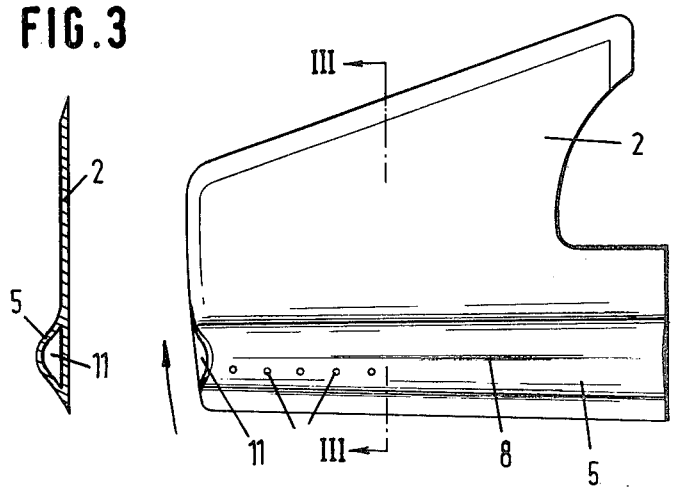

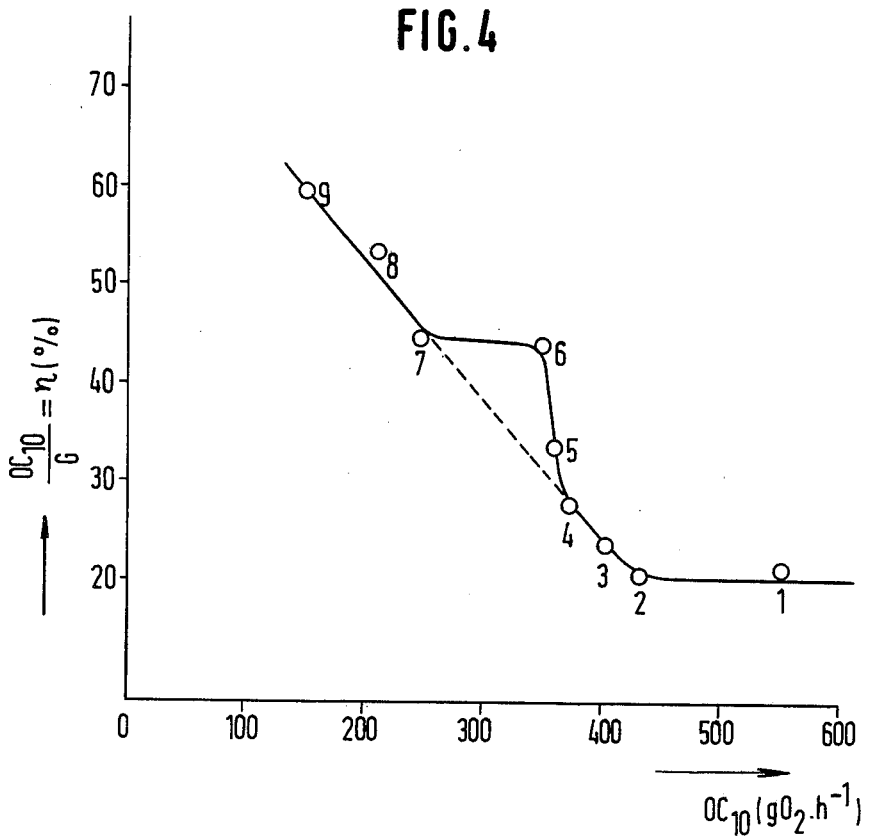

PROPELLER FOR DISTRIBUTING A GASEOUS, POWDERED OR LIQUID MATERIAL IN A LIQUID

This invention relates to apparatus for distributing a gaseous, liquid or powdered material in a liquid by rotation in the liquid of a propeller comprising two or more blades, which blades comprise a perforated hollow portion connected to a source of the gas.

In Dutch patent application No. 76,01422, there is described a method of introducing a gas, powder or liquid into a liquid and mixing these materials with the receiving liquid by means of a ship's propeller. The ship's propeller to be used for this purpose has hollow blades, the cavities being connected, via a hollow hub or directly to a hollow propeller shaft, through which hollow propeller shaft the material to be admixed can be supplied to the propeller blades. The propeller blades can be provided at the lee or suction side thereof with a plurality of perforations, through which the material to be admixed can be introduced into the receiving liquid. The transport of the substance to be admixed to the perforations in the propeller blades is preferably effected by means of excess pressure. Transportation can also be effected under the influence of the suction effect generated by the rotation of the propeller in the liquid.

In Dutch patent application No. 76,01422, there is described as a particular feature of the method concerned and the propeller used therein that the dispersing or mixing effect is favourably affected by the fact that after the passage of the perforations the substance to be admixed is exposed direct to the effect of the propeller rotating in the liquid, which is to be seen as contrary to the situation when the conventional non-hollow propellers are used. In this latter case, the substance to be admixed is added to the liquid outside the direct operational zone of the propeller, and further transported and dispersed in the liquid under the influence of the currents generated by the propeller. According to the above Dutch patent application No. 76,01422, therefore, the dispersing or mixing action of the hollow perforated propeller, as well as of conventional non-hollow mixing propellers, is judged as a purely mechanical mixing operation, with the understanding that the substances to be admixed are introduced as much as possible direct into the sphere of mechanical action of the rotating propeller blades. Thus, as stated before, the location of the perforations is not critical: these perforations can, accordingly, be provided on the thrust side or on the lee side of the propeller blades. In the embodiment of the prior hollow propeller shown in the drawing, the perforations are provided at the lee side of the blade so that they can be thought of as being connected by a line extending parallel to, and located closely along, the marginal connecting zone of the thrust and lee surfaces of the propeller blade.

Within the framework of the method defined in the opening paragraph of this specification, the present invention is characterized in that the propeller is rotated at a velocity which causes cavitation, and the material is dispersed in the liquid using the pressures occurring during the implosion of the cavitations.

The invention is based on the appreciation that in the implosion of cavitations very high pressures play a role, which may amount to as much as several thousands of bars. Owing to this high pressure, the dissolving power of the liquid which is under this high pressure is increased: thus, for example, the dissolving power of water for air increases approximately directly proportionally to the pressure in the water. The energy released thereby during the implosion offers the possiblity of intensely dispersing the content of the cavitations in the surrounding liquid.

In a preferred embodiment of the method according to the invention, a gas is dispersed in the liquid, and the method is so conducted that an amount of gas to be dispersed is supplied to the cavitations at a pressure which is higher than the vapour pressure of the liquid in the cavitations, but lower than the pressure of the liquid present in the vicinity of the cavitations.

It is true that U.S. Pat. No. 3,108,146 describes an apparatus for the aeration of water, comprising a propeller having perforated hollow blades connected to atmosphere, and mentions cavitation as an effect which conventionally occurs with revolving propellers at the lee side thereof. In this context, however, "cavitation" is exclusively defined as an area of reduced pressure; this reduced pressure can then be utilized to introduce air in the water via the perforations in the form of small bubbles. Within the framework of water aeration, however, the object of the U.S. patent is to be provide an apparatus with which a column of liquid can be transported through another liquid without a conduit, in particular a column of aerated water can be transported through a large volume of surface water, only then to proceed to the aeration of the surface water by releasing the air entrained in the transported column of water to the surface water surrounding the column. There is nothing to show that, according to the U.S. patent, cavitation is deliberately generated, and the implosion of the cavitations is utilized, to disperse air, or oxygen, in the surface water. On the contrary, in the U.S. patent it is noted with regard to this dispersion of oxygen in the surface water that the air entrained with the propelled column of water is given off to the surrounding water by the explosion—unlike implosion—of the column when it has arrived at its end point.

According to one embodiment of the apparatus as described in the U.S. patent specification, the supply of the air to the water can also take place by maintaining excess pressure in the propeller blades, which is another point which shows that the generation of cavitation and the implosion of the cavitations for utilizing the energy thus released for dispersing air in water is not an object of the invention described in the U.S. patent referred to.

Furthermore, according to French patent specification No. 2,071,402, it is known to introduce air in water by means of a ship's propeller comprising hollow passages which via a hollow propeller shaft are connected to the atmosphere, by rotation of the propeller. This aeration of the water, however, is intended to increase the available thrust of ships by increasing the fluidity of the water in the flux downstream of the ship's propeller by finely distributing air therein. The French patent, too, does not show that cavitation is deliberately generated for releasing energy by the implosion of the cavitations formed, for distributing air in water. This is confirmed by the fact that the air exit openings are arranged in the trailing edge of the blades of the propeller, and not on the blade on the lee side of the propeller. As a further possiblity for achieving the object contemplated according to the French patent, the author points to the use of a separate mixer, provided in the flux of the propeller, in which connection cavitation, of course, does not play a role at all.

The present invention also relates to an apparatus suitable for use in the method according to the invention, which comprises a propeller having two or more blades comprising a perforated hollow part, connected to a source for the gas, the apparatus being characterized in that the perforations are provided on the lee or down stream side of the propeller blade, approximately parallel to, and relative to the direction of rotation, just behind, the apex line of the propeller blade. The apex line, in this connection, is the line connecting the highest points of the propeller blade surface. On the ground of current cavitation theory it may be expected that—as viewed in the direction of rotation—the pressure will abruptly fall immediately after the apex line, and thereby the generation of cavitations is promoted, provided the rate of rotation to be used is greater than corresponds to the so-called cavitation factor. On account of the location of the perforations, indicated in accordance with the present invention, just beyond the apex line, it can be assumed that the material issuing from the perforations, for example a gas such as air, is caught in the cavitations formed in that zone. When the perforations are suitably dimensioned, it is further possible, by selection of the rate of rotation in the range of speeds above the cavitation factor, to control the prevailing partial vacuum in the cavitation zone, and thereby the supply of material via the perforations to that zone, and adjust it to a value at which implosion of cavitations occurs.

The invention is particularly suitable for dispersing gas in water, for example of air in water, such as waste water in a waste water purification plant. A preferred embodiment of the apparatus according to the invention is therefore one in which the cavities of the propeller blades are, via a hollow hub and/or hollow propeller shaft to which the propeller blades are secured, closably connected to the source for the gas, in particular the atmosphere, and in which a passage connected to the atmosphere via the hub and/or propeller shaft is provided on the propeller blades on the lee side thereof, and adjacent to, and substantially parallel to, the trailing edge thereof, at an elevation having a profile smoothly merging with the propeller blade, said passage having a plurality of perforations at its trailing side, relative to the direction of rotation, just beyond, and substantially parallel to, the apex line thereof. By means of a valve, which may be of any conventional type, in the air supply duct the amount of air issuing from the perforations can be controlled so that the air, in accordance with the above-described embodiment of the method according to the invention, is supplied to the cavitations at a pressure higher than the vapour pressure of the water in the cavitations, but lower than the pressure of the water present in the vicinity of the cavitations. The air-containing cavitations thus formed can then implode and be dispersed into small bubbles.

The cavitation which can be generated to an increased extent owing to the adapted blade profile according to the invention, as described in the preceding paragraph, can lead to so-called "racing" of the propeller. This is the effect of the propeller's rotating in a practically continuous vapour bubble, and makes it desirable for the blade angle of the propeller to be adjustable. In addition, the channel-shaped cavity will function as uniformly as possible as an air supply element throughout its length, if, as viewed in the direction of rotation of the propeller, in the liquid area the flow is as uniform as possible and furthermore the flow velocity in the direction of the propeller shaft remains constant as much as possible. Another preferred embodiment of the apparatus according to the invention, therefore, which comprises an adjustable pitch propeller, is characterized in that the propeller blades, except as regards the domed channel profile, are not hollow and substantially flat, while the propeller blade form is flared outwardly from the blade tip in the direction of the propeller shaft to produce an approximately equal flow velocity upon rotation.

The invention also relates to a propeller for use in the apparatus described hereinbefore.

The apparatus according to the invention will now be described in more detail with reference to the accompanying drawings. In said drawings, FIG. 1 shows a propeller according to the invention in perspective view, mounted around a hollow, elongated hub;

FIG. 2 shows a propeller blade in plan view, and

FIG. 3 shows a cross-sectional view of the propeller blade, taken on the line III—III in FIG. 2.

FIG. 4 is a graph of oxygen transfer efficiency in relation to oxygen introduction capacity.

Referring to the drawings, 1 represents a hollow hub with which three propeller blades 2, 3 and 4 are connected. The blade angle of the propeller blades is adjustable. Each of the propeller blades comprises a domed portion 5, 6, 7, respectively, which each encloses a channel-shaped cavity, the respective apex lines of which are designated by 8, 9 and 10. The direction of rotation of the propeller is indicated by an arrow.

In FIG. 2, which shows propeller blade 2 in plan view, 11 designates the channel cavity. By 12 are designated the perforations of propeller blade 2, which extend from the blade exterior in the blades to channel cavity 12. Propeller blades 3 and 4 comprise substantially equal holes, not shown, at corresponding places. The blade has a leading edge, and rearwardly thereof (see also FIG. 3) a relatively thin solid portion of relatively great chord-wise extent. The channel cavity 11 is rearwardly of the thin portion, within a thick hollow portion which is of small chord-wise extent; it extends substantially to the top from the hub. FIG. 3 shows the blade lower camber to be planar, the upper camber being flat substantially from the leading edge to the hollow portion housing the cavity 11, where there is a line of maximum thickness rearwardly of and close to the trailing edge. After the line of maximum thickness, the upper chamber falls to the trailing edge. The upper camber is curved forwardly and rearwardly of the line of maximum thickness, the hollow portion being under that portion of the upper camber. The blade is substantially flat forwardly and rearwardly of the hollow protion. The perforations 12 are located along a line down stream of the line of maximum thickness and generally parallel to it. At its open end 13, the hollow hub can be connected to a, likewise hollow, propeller shaft by means of which the propeller can be driven, and by means of which the gas, for example air, to be introduced into the water can be supplied to the channel-shaped cavities in the propeller blades. The hollow propeller can itself be in communication with, for example, the atmosphere through a conduit comprising a control valve, not shown.

With a propeller of the type shown in the drawings, tests have been conducted within the framework of the aeration of water to increase its oxygen content. These tests are described hereinafter in the following example in further illustration of the method and apparatus according to the invention.

EXAMPLE

Using a propeller as shown in the drawings, but having a hub which was not elongated, tests were conducted in which 3 m³ water contained in a cylindrical container having a capacity of 4 m³ was aerated.

The blade angle of the propeller was adjustable between 0° and 15°. During the tests the blade angle was maintained at 12°. The diameter of the holes 12 was 2.0 mm; the number of holes per blade was five.

The air supply was controlled by means of a valve so that a partial vacuum was adjusted in the channel cavities of, respectively, 0, 5, 10, 15, 20, 25, 30, 35 and 40 cm Hg, corresponding to absolute pressure values of 76, 71, 66, 61, 56, 51, 46, 41 and 36 cm Hg. The tests were all conducted using a speed n=1260 rpm.

Before each test, the water (tap water) was rendered oxygen-free by a treatment with sodium sulfite and cobalt-chloride as a catalyst. Each time after four measurements the water was renewed.

By electrochemical means, the oxygen content in the water was measured and further the amount of air drawn in $Q_g^*$ ($Nm^3.hr^{-1}$).

Partly on the basis of these measurements the other magnitudes shown in the following table, were calculated. In it, $tg\bar{\alpha}$ represents the mass transfer velocity coefficient ($hr^{-1}$); $OC_{10}$ (g $O_2.hr^{-1}$) the oxygen introduction capacity at 10° C.; G (g $O_2.hr^{-1}$) the amount of oxygen $O_2$ corresponding to the value $Q_g^*$, and finally $\eta$ the oxygen transfer efficiency, defined as $$\eta = \frac{\text{amount by weight of dissolved } O_2 \text{ per unit of time}}{\text{amount by weight of } O_2 \text{ drawn in per unit of time}} \times 100\% = \frac{OC_{10}}{G}.$$

TABLE

| Measurement No. | Pressure cm Hg | $tg\bar{\alpha}$ ($hr^{-1}$) | $OC_{10}$ ($g_2^O.hr^{-1}$) | $Q_g^x$ ($Nm^3.hr^{-1}$) | sure G ($G_2^O.hr^{-1}$) | $\eta$ (%) |
|---|---|---|---|---|---|---|
| 1 | 76 | 7.62 | 555.2 | 8.69 | 2607.7 | 21.2 |
| 2 | 71 | 5.46 | 433.2 | 7.03 | 2109.6 | 20.5 |
| 3 | 66 | 5.22 | 405.6 | 5.77 | 1731.7 | 23.4 |
| 4 | 61 | 5.05 | 374.4 | 4.51 | 1353.4 | 27.6 |
| 5 | 56 | 4.99 | 363.6 | 3.54 | 1068.3 | 34.0 |
| 6 | 51 | 4.74 | 351.5 | 2.67 | 801.2 | 43.8 |
| 7 | 46 | 3.28 | 247.4 | 1.85 | 551.1 | 44.5 |
| 8 | 41 | 2.84 | 212.4 | 1.35 | 404.5 | 52.5 |
| 9 | 36 | 2.05 | 152.0 | 0.85 | 255.0 | 59.6 |

FIG. 4 is a graph showing the relationship of the oxygen transfer efficiency $\eta$ as a function of the oxygen introduction capacity $OC_{10}$.

The graph shows that when the pressure in the channel cavity of the propeller blades is reduced, i.e. upon a reduction of the OC values, the value of $\eta$ intitially changes little until at a reduction of the pressure to a value of 71 cm Hg, or of the $OC_{10}$ value to 433.2 g $O_2.hr^{-1}$, $\eta$ begins to increase rather markedly according to a linear function. From an $OC_{10}$ value of approximately 374.4 g $O_2.hr^{-1}$, $\eta$ increases progressively to a value of approximately 43.8%, with the $OC_{10}$ value having decreased only to 351.5 g $O_2.hr^{-1}$. Apparently, owing to the occurence of a number of side effects or an increase of prevailing influences, for example as a result of the increase of the number of bubbles having a diameter d<2 mm, which are to be regarded as rigid bubbles and have been formed by implosion of cavitations, the increase of $\eta$ is again reduced upon a further reduction of OC.

The method of introducing air, or oxygen, in water, using the propeller according to the invention, in which there is provided a cavitation producing rate of rotation and controlled implosion of the cavitations, is to be regarded as a form of the group of bubble aeration systems, such as the practically used disk-shaped aeration elements, described in $H_2O$ 11, (1978) 107–113. In this article it is noted with regard to the disk-shaped aeration elements that the specific oxygen transfer values achieved with it are high in comparison with other systems of fine bubbles aeration. The maximum value of the specific oxygen transfer of the disk-shaped aeration elements, as noted in this article, is 27.5% (Table II).

In the book by A. C. J. Koot, "Behandeling van Afvalwater" (Treatment of Waste Water), published by Waltman, Delft, Holland, in 1974, a value of approximately 11% is mentioned as a specific oxygen transfer value for aeration through insufflation of fine air bubbles under a relatively high pressure.

Relative to these values the optimum value of the oxygen transfer efficiency $\eta$ of approximately 44% that can be achieved in accordance with the present invention accordingly means a considerable improvement.

It is clear that the apparatus and propeller described above can be modified without departing from the scope of the invention.

I claim:

1. Apparatus for effecting mixing of material in a body of liquid comprising:
a propeller having a hub and plural blades extending therefrom, each said blade having a tip and a leading edge and a trailing edge,
said blade having immediately rearwardly of said leading edge a relatively thin, solid portion of chord-wise extent, a relatively thick hollow portion rearwardly of the said solid portion of small cord-wise extent and extending substantially to said tip from said hub, the blade lower camber being substantially planar, the blade upper camber being flat substantially from said leading edge and then rising to a line of maximum thickness rearwardly of the leading edge and close to the trailing edge and then falling, the upper camber being curved forwardly and rearwardly of the line of maximum thickness and having thereunder the said hollow portion, the blade having relatively great chord-wise extent forwardly of said hollow portion, and being substantially flat forwardly of said hollow portion, perforations in said blade communicating said hollow portion with the exterior of said blade, said perforations being down stream of the line of maximum thickness and in a line generally parallel to said line of maximum thickness, and passage means in said hub fluid connected with the hollow portion of each said blade.

2. Apparatus as set forth is claim 1, said propeller blade flairing and enlarging from the tip thereof in the direction of the hub.

3. Apparatus as set forth in claim 1, said blade having a plan form for producing an approximately equal flow velocity of the liquid along the propeller blade during rotation thereof.

* * * * *